Aug. 23, 1960 W. L. KUECHLER 2,950,232
RECOVERY OF TETRAHYDROFURAN
Filed May 1, 1957
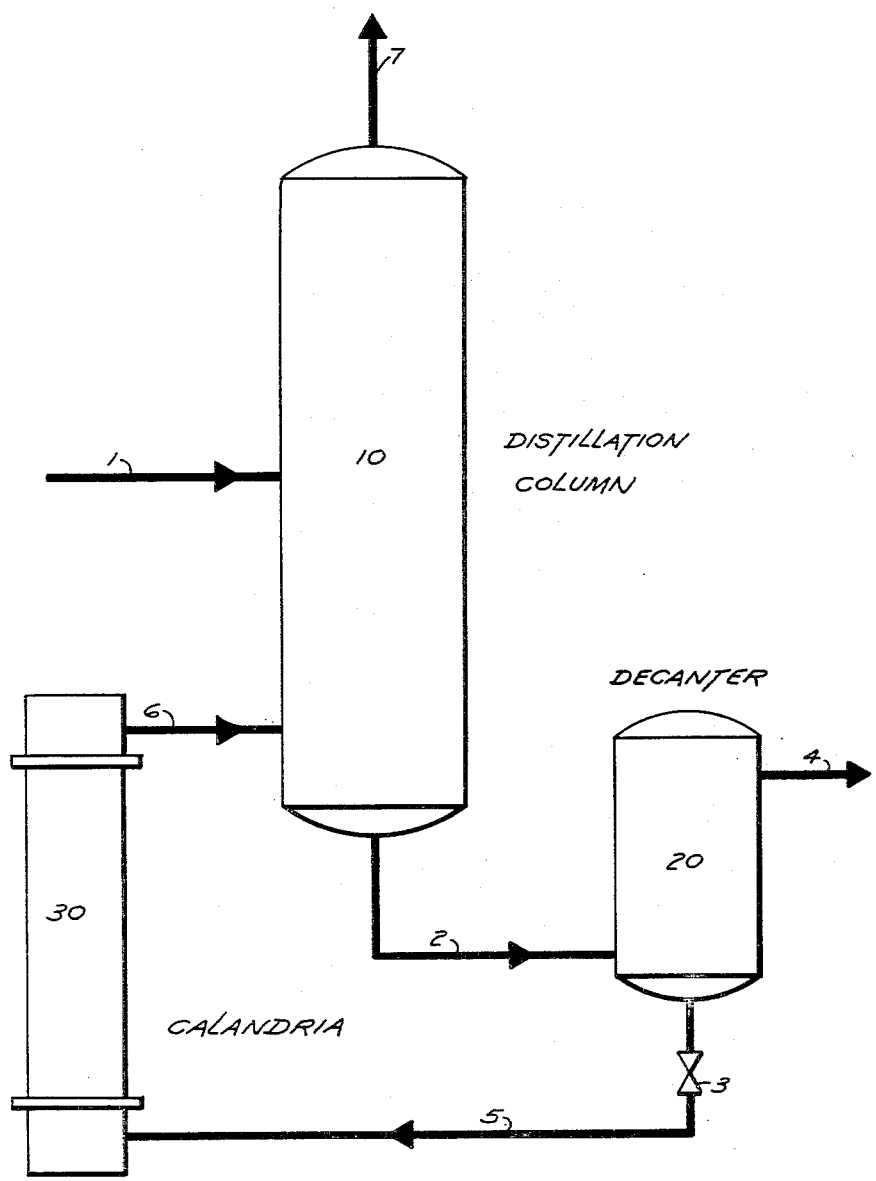
INVENTOR.
WILLIAM L. KUECHLER
BY
ATTORNEY 2,950,232

RECOVERY OF TETRAHYDROFURAN

William L. Kuechler, Newark, Del., assignor to E. I. du Pont de Nemours and Company, Wilmington, Del., a corporation of Delaware Filed May 1, 1957, Ser. No. 656,309

2 Claims. (Cl. 202—70)

This application deals with the recovery of volatile product from two phase liquid mixtures. More particularly, it relates to the recovery of tetrahydrofuran from the two phase liquid mixture obtained in the production of 1,4-dichlorobutane by reaction of tetrahydrofuran with hydrogen chloride.

1,4-dichlorobutane is a valuable intermediate in the production of nylon. An important commercial source of this material is from the reaction of tetrahydrofuran with hydrogen chloride. This is apparently a two-step reaction in which tetramethylene chlorhydrin is first formed by a reversible reaction.

(1) 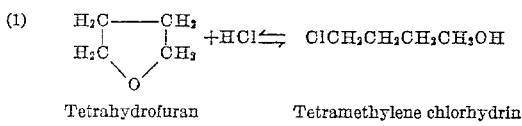

Tetrahydrofuran      Tetramethylene chlorhydrin (2) 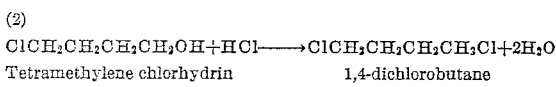

Tetramethylene chlorhydrin      1,4-dichlorobutane

The reactions shown above normally yield two-phase mixtures consisting of an aqueous acid phase and an organic phase whose major constituent is dichlorobutane. The latter is substantially insoluble in water or aqueous hydrogen chloride. In addition to water, hydrogen chloride and 1,4-dichlorobutane, this mixture also contains unreacted tetrahydrofuran and tetramethylene chlorhydrin. Tetrahydrofuran and tetramethylene chlorhydrin are soluble in both the aqueous and the non-aqueous phase. In order to produce 1,4-dichlorobutane economically it is essential to recover unreacted tetrahydrofuran and minimize its loss in the form of undesired reaction products such as tetramethylene chlorhydrin.

Prior art methods for the recovery of 1,4-dichlorobutane from the two-phase reaction mixtures described above include separation and fractional distillation of the non-aqueous phase preceded in some instances by distillation of tetrahydrofuran from the crude mixture. In other cases, the 1,4-dichlorobutane is steam distilled as an azeotrope and then separated from the aqueous distillate. In these procedures, substantial amounts of both tetrahydrofuran and tetramethylene chlorhydrin are lost in the aqueous phase from which they cannot be economically recovered.

The object of this invention is to provide a process for the recovery of a voltatile organic product soluble in both phases of a two-phase mixture comprising an aqueous and a nonaqueous phase. An additional object is to provide a process for recovering tetrahydrofuran from a two-phase liquid mixture produced by reaction of tetrahydrofuran and hydrogen chloride in the production of 1,4-dichlorobutane. A further object is to provide a process for the recovery of tetrahydrofuran from the two-phase liquid mixture produced by reaction of tetrahydrofuran with hydrogen chloride while simultaneously reducing the tetramethylene chlorhydrin content of the said mixture. A still further objective is to provide suitable apparatus for carrying out the aforesaid objectives. Additional objectives will become apparent in the following discussion.

The above-mentioned objects of this invention are achieved by passing a two-phase mixture of the type described into a distillation column designed to remove a volatile organic product, withdrawing the bottom product of the column, separating the two phases therein, passing a portion of the separated aqueous phase to a vaporizer or calandria and returning the vapors of the aqueous phase to the bottom portion of the said column to supply heat for distillation and raise the aqueous phase concentration of the column liquor while continuously removing volatile organic product from the top of the column and the balance of the bottom product from which a portion of the aqueous phase had been separated.

The preferred method of operating the invention is illustrated in greater detail by the accompanying drawing which is explained with particular reference to the separation of tetrahydrofuran and crude 1,4-dichlorobutane from a two-phase reaction mixture obtained by the action of hydrogen chloride on tetrahydrofuran. The aforesaid mixture is introduced into the distillation column designated as 10 through line 1. The bottom product of the column is removed to decanter, 20, by line 2. The two phases separate in the decanter and a portion of the aqueous phase is removed through valve 3 to line 5 leading to the vaporizer or calandria, 30. The aqueous phase is usually the denser of the two phases involved when excess hydrogen chloride has been employed in the reaction and the concentration of hydrogen chloride in this phase is around 20% or above. The aqueous phase is boiled in the vaporizer and the vapors are fed to the lower portion of the distillation column through line 6 which is below the point at which the two-phase mixture is introduced through line 1. Tetrahydrofuran vapors and some hydrogen chloride gas are removed as overhead products from the top of the column through line 7. The balance of the bottom product of the column which normally contains some aqueous phase is removed from the decanter through line 4 for more precise separation in a second decanter not shown in the drawing. The non-aqueous phase consisting of crude 1,4-dichlorobutane is then refined, e.g. by removal of acid impurities by an alkali wash followed by fractional distillation.

Although the apparatus shown in the drawing represents the preferred means for carrying out the invention of this application, it is understood that the invention is not limited to this specific embodiment. Any device that will preferentially increase the concentration of aqueous phase in the column bottom by separating and removing a major proportion of the non-aqueous organic phase and returning principally aqueous phase to the vaporizer will serve the purpose. Several modifications and equivalents for accomplishing this will be immediately apparent to those skilled in the art. The specific design and materials of construction employed in the column, separator or decanter and the vaporizer or calandria are naturally subject to variation depending on the degree of fractionation desired, rate and efficiency of phase separation, corrosion problems, etc. These are well known and conventional parts whose construction in a variety of modifications will be readily apparent to any chemical engineer.

This invention makes it possible to effect an outstanding reduction in the tetrahydrofuran and tetramethylene chlorhydrin content of the aqueous phase leaving the process. The tetrahydrofuran and hydrogen chloride leaving the still as overhead are then available for reuse in the production of 1,4-dichlorobutane so that high net yields are obtained.

The advantages of the invention are apparently partly inherent in the fact that it maintains an elevated concentration of aqueous phase in the column which seems to favor extraction of the non-aqueous phase and dehydrohalogenation of tetramethylene chlorhydrin to tetrahydrofuran and hydrogen chloride by the reverse of Reaction 1. This condition may also contribute to some conversion of the chlorhydrin to 1,4-dichlorobutane by reaction with hydrogen chloride. It also appears that circulation of an aqueous phase to the vaporizer rather than a mixture consisting largely of an organic liquid increases the efficiency of heat transfer so that the so-called "boil-up" is greatly increased. Whatever the explanation, it has been found that the invention results in an outstanding improvement in the removal of tetrahydrofuran from the two-phase reaction mixture which was not expected and is not to be restricted by the theoretical speculations summarized above.

The invention is illustrated in still greater detail by the following examples.

*Example 1*

The utility of this invention was demonstrated by comparing the results obtained when a reaction product of tetrahydrofuran and hydrogen chloride was distilled to remove tetrahydrofuran using a packed column operated with and without a phase separation procedure.

The column employed in this experiment was approximately 6 feet high 3 inches in diameter and was packed with ¼ inch Raschig rings. The reaction mixture was produced by the reaction of two molecular proportions of hydrogen chloride with one molecular proportion of tetrahydrofuran. It consisted of approximately 85% by weight of a non-aqueous phase whose major constituent was 1,4-dichlorobutane and 15% of an aqueous phase containing approximately 20% hydrogen chloride.

In the first part of the experiment a portion of the two-phase bottom product of the column was fed directly to a calandria where it was vaporized and the vapors were fed into the bottom portion of the column. Following this, the bottom product of the column was drawn off through a wide tube in which the aqueous phase settled to the bottom and was drawn off to feed the vaporizer or calandria while the remainder consisting principally of non-aqueous phase was removed by means of a side arm. The distillation process was run for approximately 300 hours without the separator tube and for approximately the same period after the separator had been installed. Product samples were removed for analysis from time to time and the concentrations of tetrahydrofuran and tetramethylene chlorhydrin determined for the aqueous phase. The analysis before and after installation of the decanter are contrasted in the following table.

| Constituent | Average Concentration in Percent by Weight | | Percent Reduction Due to Separator Process |
| --- | --- | --- | --- |
| | Before | After | |
| Tetrahydrofuran | 8.3 | 0.3 | 96 |
| Tetramethylene Chlorhydrin | 4.3 | 2.6 | 40 |

As will be seen, the process of this invention effectively reduces the tetrahydrofuran and tetramethylene chlorhydrin content of the aqueous phase. Total saving of tetrahydrofuran calculated as the average percent equivalent of both tetrahydrofuran and tetramethylene chlorhydrin in the aqueous phase amounted to a reduction of potentially available tetrahydrofuran from 11.2 to 2.0% by weight of the aqueous phase.

The experiment also showed that the capacity of the decanter equipped system was superior to that of the unmodified system. In the first part of the experiment the two-phase product was fed to the column at a rate of 3 to 4 pounds per hour. When this rate was raised to 10 pounds per hour for a time, the tetrahydrofuran content of the aqueous phase rose to 21%. In the second part of the experiment the feed rate was 11 to 13 pounds per hour throughout.

*Example 2*

The invention was also applied to plant scale equipment. The column used was approximately 50 feet high, 40 inches in diameter, and was packed with 1 inch saddles. The two-phase reaction mixture was substantially identical with that of Example 1.

Before employing the decanter system, a portion of the two-phase bottom product was fed directly to the calandria by natural circulation where it was vaporized and the vapors were fed into the bottom portion of the still. Following this, the column was equipped with a decanter as shown in the drawing and the calandria was fed with a portion of the aqueous phase separated by this means. Samples were periodically removed from the bottom product and analyzed for tetramethylene chlorhydrin in both the organic and aqueous layers. The following table gives the average results for approximately 140 hours' operation before employing the decanter and 120 hours after the decanter had been installed.

| Percent Tetramethylene Chlorhydrin | Average Concentration in Percent by Weight | | Percent Reduction |
| --- | --- | --- | --- |
| | Before | After | |
| In organic layer | 12.0 | 3.3 | 72.5 |
| In water layer | 7.6 | 1.7 | 77.5 |

Having described my invention, I claim:

1. In a fractional distillation process for recovering tetrahydrofuran from a liquid two-phase mixture comprising tetrahydrofuran, 1,4-dichlorobutane, tetramethylene chlorhydrin, hydrogen chloride and water, the step of removing said tetrahydrofuran while simultaneously reducing the concentration of tetramethylene chlorhydrin in the said two-phase mixture by feeding the said two-phase mixture directly into a distillation column, withdrawing the bottom product of said distillation column and separating the phases therein, passing a portion of the separated aqueous phase to a vaporizer, returning the vapors of said portion of said aqueous phase to the bottom part of the aforesaid distillation column and continuously removing tetrahydrofuran from the top of said distillation column.

2. In a process for the manufacture of 1,4-dichlorobutane, the steps for recovering tetrahydrofuran and 1,4-dichlorobutane from a two-phase mixture consisting of an aqueous phase and a non-aqueous phase comprising tetrahydrofuran, 1,4-dichlorobutane, tetramethylene chlorhydrin, hydrogen chloride and water while simultaneously reducing the concentration of tetramethylene chlorhydrin in the said two-phase mixture, said steps comprising feeding the said two-phase mixture directly into a distillation column, withdrawing the bottom product of said column into a decanter and separating the two phases therein, passing a portion of the separated aqueous phase to a vaporizer or calandria, returning the vapors of said portion of said aqueous phase from the said vaporizer to the bottom part of said column at a point below the point at which said two-phase mixture is fed to said column, removing the balance of the bottom product from said decanter and refining the non-aqueous phase therein, said non-aqueous phase consisting of crude 1,4-dichlorobutane, and continuously removing tetrahydrofuran from the top of said column.

References Cited in the file of this patent

UNITED STATES PATENTS

| | | |
| --- | --- | --- |
| 2,460,117 | Beckel et al. | Jan. 25, 1949 |
| 2,577,156 | Robertson | Dec. 4, 1951 |
| 2,729,600 | Beach | Jan. 3, 1956 |
| 2,750,398 | Courter et al. | June 12, 1956 |